United States Patent [19]

Geppaard

[11] Patent Number: 4,636,237
[45] Date of Patent: Jan. 13, 1987

[54] MANUFACTURING DRAWN SHEET GLASS

[75] Inventor: Adrianus Geppaard, Mol, Belgium

[73] Assignee: Glaverbel, Brussels, Belgium

[21] Appl. No.: 724,808

[22] Filed: Apr. 19, 1985

Related U.S. Application Data

[63] Continuation of Ser. No. 517,208, Jul. 25, 1983, abandoned.

[30] Foreign Application Priority Data

Jul. 30, 1982 [GB] United Kingdom ............... 8222083

[51] Int. Cl.[4] .......................................... C03B 15/06
[52] U.S. Cl. ........................................ 65/95; 65/90;
65/196; 65/204
[58] Field of Search .................... 65/90, 95, 202, 204,
65/205, 196

[56] References Cited

U.S. PATENT DOCUMENTS

| 1,556,726 | 10/1925 | Slingluff | 65/205 |
| 1,645,053 | 10/1927 | Howard | 65/90 |
| 1,860,044 | 5/1932 | Mambourg | 65/202 |

FOREIGN PATENT DOCUMENTS

| 240448 | 6/1926 | United Kingdom. |
| 1054322 | 1/1967 | United Kingdom. |
| 1329433 | 9/1973 | United Kingdom. |

OTHER PUBLICATIONS

Tooley, Handbook of Glass Manufacture, vol. 2, Ogden, 1960, p. 242.
Glass Machines, pp. 342-361, Giegerich et al, Springer & Verlag, N.Y., N.Y, 1969.

Primary Examiner—Arthur Kellogg
Attorney, Agent, or Firm—Spencer & Frank

[57] ABSTRACT

Molten glass 1 flows continuously from a glass melting furnace 2 to a drawing tank 7 when the glass is drawn as a continuous ribbon 10 and is passed over a bending roll 13 in a drawing chamber 8 above the tank 7 and then to a horizontal annealing lehr 14.

A high yield of glass, especially thin glass, of a high standard of thickness uniformity and good planeity is promoted and facilitated by causing the molten glass 1 to flow upwardly through a slot 11 in a refractory device 12 partially immersed in molten glass in a deep drawing tank.

12 Claims, 2 Drawing Figures

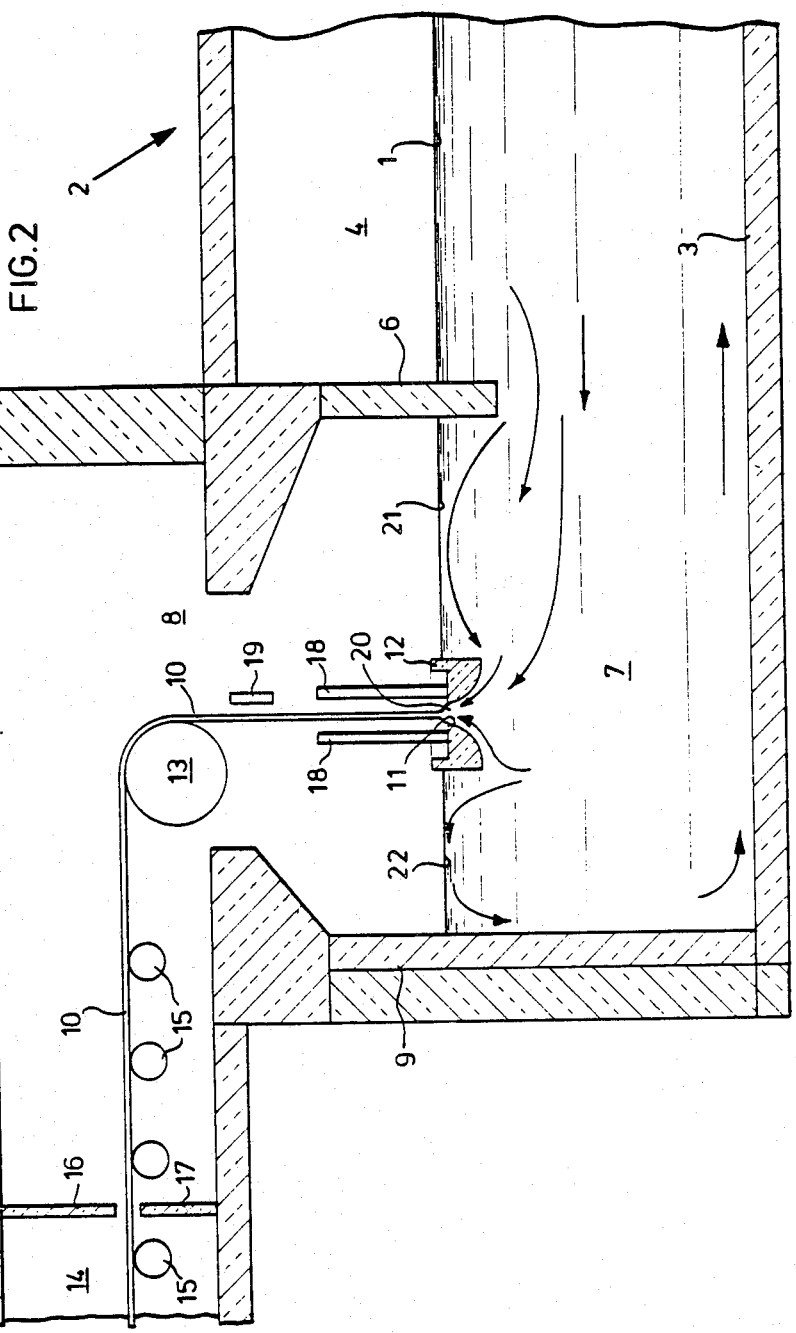

MANUFACTURING DRAWN SHEET GLASS

This application is a continuation of application Ser. No. 06/517,208, filed July 25th, 1983, now abandoned.

BACKGROUND OF THE INVENTION

This invention relates to the manufacture of drawn sheet glass and provides a process and plant for the production of such glass. The invention extends to sheet glass produced using such a process or plant.

In the continuous production of drawn sheet glass it is necessary to form molten glass into a ribbon and then to anneal it as it cools in order to form a cool, stress-free ribbon of glass which can then be cut into sheets.

Classical processes are known in which the ribbon is cooled in a vertical annealing lehr and others are known which make use of a horizontal annealing lehr.

These processes, often referred to as "vertical drawing" and "horizontal drawing" processes, are of quite different types. In the case of a vertical annealing lehr, the ribbon is drawn upwardly by rollers, through the annealing lehr which may be 6 m to 10 m in height depending on the actual process used, and into a cutting loft above the lehr where the ribbon is cut into sheets. The lowest rollers are located a sufficient distance above the root of the ribbon (usually 2 m or more) for the glass to be hard enough not to be marred by the rollers.

In the case of a horizontal annealing lehr, the upwardly drawn ribbon is folded about a horizontal bending roll onto a horizontal conveyor leading through the lehr. The bending roll is located at a distance above the root of the ribbon (usually 1 meter or so) where the glass is soft enough to be passed to the horizontal lehr. Horizontal annealing lehrs are often more than 50 m long.

The present invention is concerned with a sheet glass manufacturing process wherein molten glass formed in a glass-melting tank flows continuously to a drawing tank whence the glass is drawn upwardly in the form of a continuous ribbon, is folded about a bending roll and then passed to a horizontal annealing lehr.

Advantages of such horizontal drawing processes over vertical drawing processes are well known. The drawn ribbon can be supported and thus stabilized by a bending roll at an earlier stage than by gripping rollers. Because a longer lehr can be used, the ribbon can be cooled more slowly so that it is relatively stress free, and so that the glass is easier to cut. It is also easier to control annealing in a horizontal lehr than in a vertical lehr where convection currents can be particularly troublesome. There is thus less risk that a ribbon will break due to thermal shock in a horizontal lehr. Even if a horizontally drawn ribbon should break, no longitudinal fracture can propagate back beyond the bending roll where the glass is still soft enough to be folded. There is accordingly a greatly reduced risk that any broken glass will fall down into the drawing tank.

Horizontal drawing of glass does however have limitations in the attainable yield of glass of an acceptable standard as regards its uniformity of thickness. This is especially true when drawing very thin glass. In fact for large scale continuous production the practical lower limit of thickness which is observed in any of the known horizontal drawing processes is about 0.6 mm.

SUMMARY OF THE INVENTION

It is an object of the present invention to provide a horizontal glass drawing process by which thin glass sheet of a high thickness-uniformity standard can be reliably and economically produced on an industrial scale.

According to the present invention, there is provided a sheet glass manufacturing process wherein molten glass formed in a glass-melting tank furnace flows continuously to a drawing tank whence the glass is drawn upwardly in the form of a continuous ribbon, is folded about a bending roll and then passed to a horizontal annealing lehr, characterised in that the glass is caused to flow upwardly through a slot defined by refractory material partially immersed in molten glass in a deep drawing tank.

The present invention makes it easier to achieve a high yield of thin flat glass within a very narrow tolerance range of a predetermined thickness. The invention also affords other advantages as will be adverted to hereinafter.

The principal known horizontal drawing process is the Colburn (or Libbey-Owens) process which dates from the first two decades of this century. In that process the glass is drawn from a meniscus at the surface of the molten glass in a shallow drawing tank, usually 20 to 25 cm deep which may be heated from below so that the viscosity of glass in the drawing tank is sufficiently low for the ribbon to be fed by surface currents of glass flowing in that tank.

Comparative tests have been made as between a known Colburn type process and a process according to the present invention. The tests were made under similar conditions. In the process according to the invention, use was made of a bar which defined a drawing slot and which was partly immersed in the molten glass with the result that hydrostatic pressure forced molten glass upwards into the slot.

Using the previously known process it was found that a ribbon of 2 mm nominal thickness could not easily be drawn over a lengthy continuous period of time with a variation in thickness across a usefully wide central portion of its width of significantly less than 0.2 mm. Using the process according to the present invention, sheet glass could be drawn having a thickness of 2 mm±0.05 mm over a central part of the ribbon width wider than the central portion of the comparative ribbon.

Using the previously known process, a glass ribbon with a nominal thickness of 0.4 mm could be produced with difficulty, but for commercial production of glass of acceptable quality the minimum practical thickness which could be produced was 0.6 mm. Using the process according to the present invention glass of a commercially acceptable quality was produced to a thickness of 0.4 mm±0.05 mm without difficulty in the very first test, and thinner glass has been produced.

During production runs using the previously known process it has happened that a transverse fracture has developed in the ribbon between the bending roll and the first conveyor rolls. When this has happened, surface tension effects at the root of the ribbon and the weight of the ribbon portion extending vertically between the ribbon root and the bending roll have caused separation of the ribbon at the fracture line, and the ribbon has collapsed back into the drawing tank resulting in a considerable loss of production. During testing of the process according to the present invention it also happened that such a transverse fracture developed. In this case however tensile forces on the ribbon were insufficient to separate it at the fracture line and the loss of production was very much less. This result was most surprising, but it is now believed to be due to the fact that the glass going to feed the root of the ribbon was subject to hydrostatic forces pushing it upwardly rather than the root of the ribbon being fed as a concave meniscus at the surface of the molten glass in the drawing tank.

This advantage is especially marked when the said refractory device is immersed in the molten glass in the drawing tank to a depth so as to maintain an onion of glass at the top of the slot from which the ribbon is drawn, as is preferred.

It was found that improved planeity of the annealed cooled ribbon resulted from the adoption of the present invention. The reasons for this surprising result are not clearly understood.

A further advantage afforded by the adoption of the present invention was that dust and other particles on the surface of the glass in the drawing tank were not drawn into the ribbon. This can be a particularly serious defect of horizontal surface drawing processes such as the Colburn process, especially if such a particle should become stuck to the bending roll when the same particle will cause periodical defects in the ribbon.

The present invention substantially avoids other disadvantages of horizontal surface drawing processes. During the drawing of glass in such processes there is set up a current of air which flows from the annealing lehr to the drawing chamber. Such air current is of course cooler than the glass in the drawing tank and can have an irregular cooling effect on the surface of the melt. In surface drawing processes, these irregularities can be entrained in the ribbon to cause defects. Another cause of defects in the ribbon arises because it is desirable for some purposes to introduce sulphur dioxide into the annealing lehr. Sulphur dioxide can also flow back into the drawing chamber where it will react with the very hot glass at the surface of the melt and at the root of the ribbon to such an extent that defects can be caused. In a process according to the invention the ribbon is formed from glass coming from the depth of the drawing tank so it is only the root of the ribbon which can be attacked. The very hot glass forming the ribbon is thus exposed to the risk of attack by sulphur dioxide for a very much shorter time which is insufficient to cause appreciable defects.

Because the drawing tank used in a process according to the invention is deep, a highly beneficial flow pattern of molten glass within the tank can be set up. Glass flowing into the drawing tank and into contact with its side and downstream end walls will naturally cool, and because the drawing tank is deep this cooler glass can form a sinking current at those walls which will form a return current at the sole of the drawing tank flowing back to its entrance and thence to upstream regions of the installation. As a result of this, the glass flowing in thermal contact with those tank walls in any given time will be of comparatively greater volume, so that for a given rate of heat transfer through those walls the temperature loss to which the molten glass is subject will be reduced. This promotes uniformity of temperature and thus viscosity of glass entering the drawing slot which has a very favourable effect for the production of a high yield of glass with good uniformity of thickness, and also contributes to a reduced tendency for glass to devitrify in the drawing slot, especially at its ends.

When such a flow pattern is established certain other defects in the glass produced can also be reduced. When molten glass flows in contact with refractory tank walls it can dissolve or scour out material from those walls. The entrainment of such material in the drawn ribbon gives rise to defects. However by the use of a deep drawing tank it can be ensured that such material is entrained in return currents flowing to upstream regions of the installation so that that material does not enter the ribbon before it is fully dissolved into a homogeneous melt.

This beneficial flow pattern of currents of molten glass within the drawing tank can be further promoted by adopting one or more of the following features:

i. The glass within the drawing tank is maintained at a depth of at least 1 meter, and preferably at a depth in the range 1.2 to 1.5 meters inclusive.

ii. Molten glass is fed to the drawing tank from a furnace portion (for example a feed channel or a distribution tank) of substantially the same depth as the drawing tank.

iii. The depth of the glass in the drawing tank is substantially equal to the depth of the glass in the melting tank.

It is especially preferred to adopt each of those features.

It is also preferred that glass should flow into the drawing tank over substantially its full width.

Upper regions of the drawing chamber are preferably screened from the glass within the drawing tank. The glass is preferably caused to flow upwardly through the slot of a one-piece debiteuse which constitutes said refractory device.

The present invention is especially applicable in the production of a glass ribbon drawn to a thickness of 3 mm or less, for example to a thickness in the range 0.4 mm to 2.2 mm.

The present invention extends to plant for the production of sheet glass by a process according to the invention as above defined. The advantages of such plant will readily be inferred from what has been written above in respect of the process of the invention.

Accordingly the present invention provides a sheet glass manufacturing plant comprising a glass melting tank furnace arranged for continuous feeding of molten glass to a drawing tank whence the glass can be drawn upwardly as a continuous ribbon, a bending roll located in a drawing chamber above the drawing tank about which the ribbon can be folded, and a horizontal annealing lehr for receiving the ribbon of drawn glass after its folding about the bending roll, characterised in that a refractory device is partially immersed in the molten glass in a deep drawing tank to define a drawing slot through which the glass passes to form the ribbon.

Such a plant preferably includes one or more of the following optional features:

i. The depth of the drawing tank is at least 1 meter and is preferably in the range 1.2 to 1.5 meters inclusive.

ii. A channel for feeding molten glass from the melting tank to the drawing tank has its sole wall at substantially the same level as the sole wall of the drawing tank.

iii. The sole wall of the drawing tank is at substantially the same level as the sole wall of the melting tank.

iv. The entrance for feeding molten glass to the drawing tank extends across substantially the full width of that tank.

v. Said slot-defining refractory device is in the form of a one-piece debiteuse.

The refractory device used to define the drawing slot may be of ceramic as is conventional, or it may be of metal or metal-lined ceramic as has been proposed in the literature.

BRIEF DESCRIPTION OF THE DRAWING

The invention will now be described by way of example only with reference to the accompanying diagrammatic drawings in which:

FIG. 2 is a similar view of a second embodiment of the invention.

DESCRIPTION OF THE PREFERRED EMBODIMENTS

Figure 1:
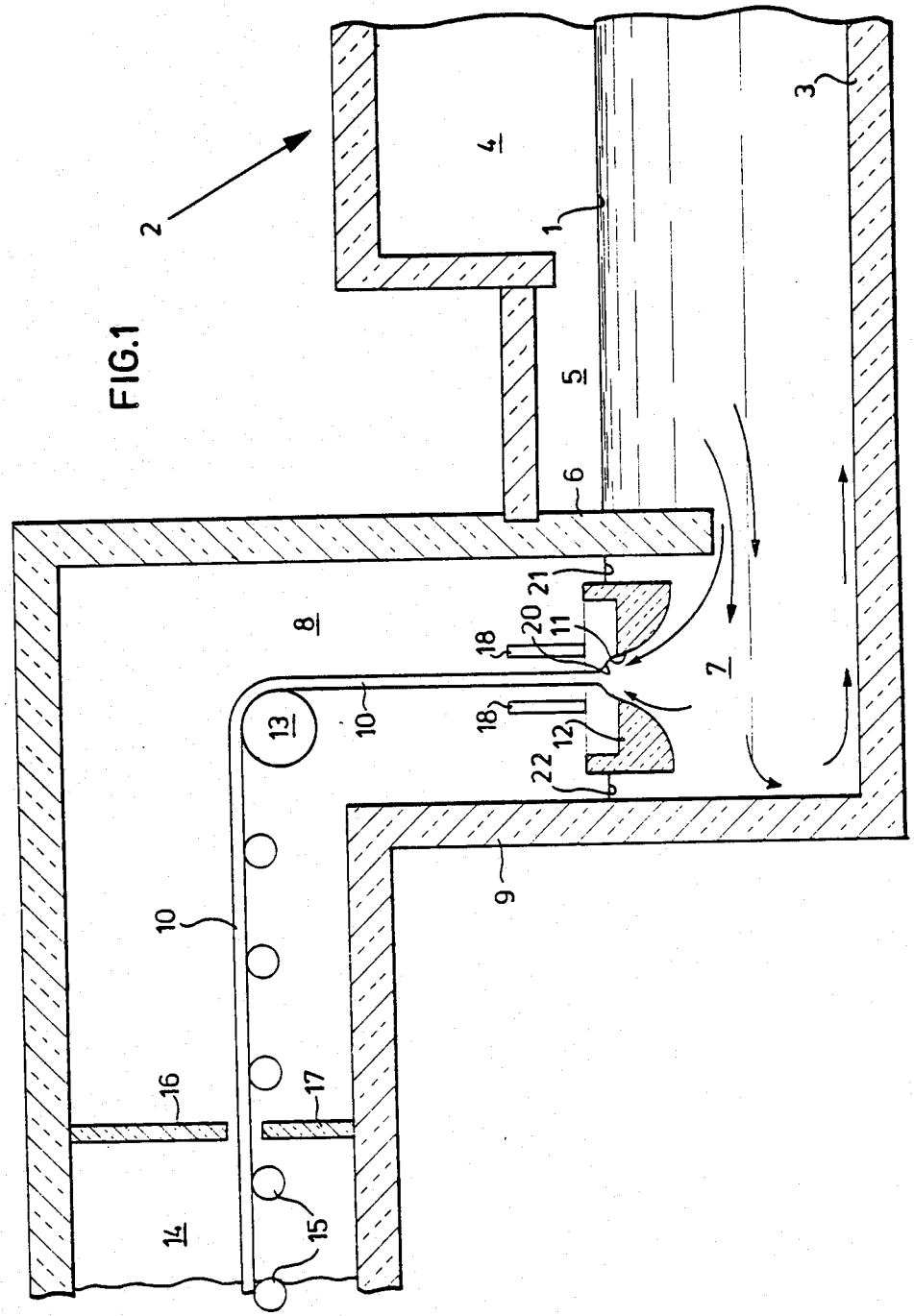
FIG. 1 is a schematic sectional detail view through a glass manufacturing plant in accordance with a first embodiment of the invention.

In the drawings molten glass 1 is contained within a glass-melting tank furnace 2 having a sole wall 3 and is fed from a conditioning zone 4 of the furnace through a channel (shown at 5 in FIG. 1) beneath a bridge wall 6 into a drawing tank 7, at the base of a drawing chamber 8, whose downstream end is closed by a rear end wall 9. In accordance with the invention, glass is drawn upwardly as a continuous ribbon 10 through a slot 11 defined by refractory material, here shown in the form of a one-piece debiteuse 12, which is partially immersed in the glass 1 in the drawing tank 7 and is folded over a bending roll 13 whence it passes to a horizontal annealing lehr 14.

Conveyor rolls 15 are provided for conveying the ribbon 10 through the lehr 14.

The drawing chamber 8 is screened off from the lehr 14 by upper and lower screening walls 16,17 which define a slot through which the ribbon 10 is conveyed. If desired the upper screening wall 16 may be formed as a flexible curtain, for example of asbestos or other suitable refractory material, and this can be allowed to brush against the ribbon to provide protection for the drawing chamber against the ingress of dust from the annealing lehr. Alternatively, a hot air curtain may be used.

Located above the debiteuse 12 are a pair of coolers 18 for cooling the ribbon 10 as it passes between them to the bending roll 13.

A heater (not shown) may be provided if required to ensure that the ribbon 10 is sufficiently soft to pass over the bending roll 13 without risk of breaking.

An optional cooler 19 for the front face of the ribbon as it rises to the bending roll 13 is shown in FIG. 2.

The debiteuse 12 is immersed in the molten glass 1 in the drawing tank 7 so that the top of the slot 11 is below the level of the surface of the melt. As a result of this, molten glass is forced up through the slot to form an onion 20 at the top of the slot 11 from which the ribbon 10 is drawn. The edges of the root of the ribbon 10 may be passed between forks which serve to stabilise the drawn ribbon margins.

The debiteuse 12 defining the drawing slot 11 is spaced from the bridge wall 6 defining the upstream end of the drawing tank 7 and from the rear end wall 9 defining the downstream end of that tank to leave surface areas respectively 21,22 of the glass in the drawing tank exposed.

The flow pattern of currents in the glass in the drawing tank 7 is represented by arrows. Glass flows into the drawing tank 7 immediately beneath the bridge wall 6 and part of it is drawn up into the ribbon 10. Some of the glass flows on close to the rear end wall 9 where it is cooled so that it forms a sinking current which then flows slowly back to the conditioning zone 4 of the glass melting tank furnace 2 along the sole wall 3. In the illustrated embodiments, the drawing tank 7 and the conditioning zone 4 of the tank furnace 2 have a common, horizontal sole wall 3.

In FIG. 1, the debiteuse 12 is located close to the bridge wall 6 and the rear end wall 9 so that the exposed surface areas 21,22 of glass in the drawing tank are short.

In FIG. 2 the spacing of the debiteuse 12 from the bridge wall 6 and the rear end wall 9 is very much greater than it is in FIG. 1, and is sufficient to allow natural currents in the glass continuously to displace the glass beneath the surface regions 21,22. By way of example, in a plant for producing a 2.8 m wide ribbon, the gap between the debiteuse and the bridge wall may be increased from 50 mm to 1100 mm while that between the debiteuse and the rear end wall may be increased from 50 mm to 700 mm.

The use of such an elongated drawing tank 7 is described and claimed in a co-pending application which also claims priority from British Patent Application No. 82 22 083.

The depth of molten glass in the drawing tank 7 is suitably in the range 1.2 to 1.5 meters in each of the illustrated embodiments.

The debiteuse 12 may be held at a required depth in the molten glass in the drawing tank by means of screw-operated levers (not shown) mounted to the side walls of the drawing tank if desired.

Alternatively or in addition, the debiteuse may be made of a ceramic or other refractory material which is buoyant in the molten glass in the drawing tank 7. The debiteuse 12 can then be held in place by the coolers 18 resting on it and forcing it down to the required depth so that hydrostatic pressure forces molten glass upwardly through the slot 11 to form the onion 20 at the root of the ribbon.

I claim:

1. In a sheet glass manufacturing process including the steps of: causing molten glass to flow continuously from a glass-melting tank furnace, in which the molten glass is produced, to a drawing tank; drawing molten glass upwardly in the form of a continuous ribbon from the drawing tank; bending the ribbon about a bending roller located above the drawing tank; maintaining at least the major portion of the ribbon out of contact with any solid body between the drawing tank and the bending roller; and passing the ribbon from the bending roller into a horizontal annealing lehr, the improvement wherein the drawing tank is a deep drawing tank in which molten glass is maintained at a depth of at least 1 meter, and said step of drawing comprises partially immersing a refractory device in the form of a one-piece debiteuse provided with a slot in the molten glass in the drawing tank to a sufficient depth for causing molten glass to flow upwardly through the slot under the influence of hydrostatic pressure so as to maintain an onion of glass at the top of the slot from which the ribbon is drawn, wherein the top of said slot is below the level of the surface of molten glass in said drawing tank and said debiteuse further has a rim extending around the periphery of said debiteuse, spaced laterally from said slot, and projecting upwardly from the level of the top of said slot to a height above the level of the surface of the molten glass in the drawing tank, to form a region surrounding the top of said slot which is free of molten glass.

2. A process according to claim 1, wherein said step of causing molten glass to flow comprises feeding the molten glass to the drawing tank through a feed channel of substantially the same depth as the drawing tank.

3. A process according to claim 2, wherein the depth of the glass in the drawing tank furnace is substantially equal to the depth of the glass in the melting tank.

4. A process according to claim 1, wherein said step of causing molten glass to flow comprises feeding the molten glass to the drawing tank over substantially the full width thereof.

5. A process according to claim 1, wherein the glass ribbon is drawn to a thickness of 3 mm or less.

6. Sheet glass produced by a process according to claim 1.

7. A process according to claim 1 wherein the glass within the drawing tank is maintained at a depth of 1.2 to 1.5 meters.

8. A sheet glass manufacturing plant comprising: a glass melting tank furnace for producing molten glass; a drawing tank connected to the furnace to receive a continuous flow of molten glass from the furnace so that the drawing tank is filled with molten glass to a predetermined depth of at least 1 meter; a bending roller disposed above said drawing tank; a horizontal annealing lehr spaced horizontally from said bending roller; and a refractory device in the form of a one-piece debiteuse provided with a slot and a rim extending around the periphery of said debiteuse, spaced laterally from said slot, and projecting upwardly from the top of said slot, said debiteuse being disposed in said drawing tank to be partially immersed in molten glass when said tank is filled with molten glass to said predetermined depth so that the top of said slot is below the level of the surface of molten glass in said drawing tank and said rim projects to a height above the level of the surface of molten glass in the drawing tank; said plant being arranged, said slot being dimensioned, and said refractory device being disposed to be immersed in the molten glass, such that, in operation, molten glass passes through the slot so that an onion of glass is maintained at the top of said slot and said rim forms a region surrounding the top of said slot which is free of molten glass, and molten glass is drawn upwardly in the form of a continuous ribbon from the onion, without at least the major portion of the ribbon contacting any solid body below said bending roller, and the ribbon is bent around said bending roller and passes from said bending roller into said annealing lehr.

9. A plant according to claim 8, wherein said drawing tank has a sole wall and further comprising means defining a channel for feeding molten glass from the melting tank to the drawing tank, said channel having a sole wall at substantially the same level as the sole wall of said drawing tank.

10. A plant according to claim 9, wherein the melting tank has a sole wall at substantially the same level as the sole wall of the drawing tank.

11. A plant according to claim 8 wherein the predetermined depth of molten glass in the tank is in the range of 1.2 to 1.5 meters.

12. A plant according to claim 8 wherein said drawing tank has an entrance via which molten glass flows into said drawing tank and which extends across substantially the full width of said drawing tank.

* * * * *